(12) United States Patent
Jensen

(10) Patent No.: US 8,610,677 B2
(45) Date of Patent: Dec. 17, 2013

(54) TOUCH-SENSITIVE POINTING DEVICE WITH GUIDING LINES

(76) Inventor: Jens Martin Jensen, Virum (DK)

( * ) Notice: Subject to any disclaimer, the term of this patent is extended or adjusted under 35 U.S.C. 154(b) by 300 days.

(21) Appl. No.: 12/598,793

(22) PCT Filed: Apr. 25, 2008

(86) PCT No.: PCT/DK2008/000157
§ 371 (c)(1),
(2), (4) Date: Nov. 4, 2009

(87) PCT Pub. No.: WO2008/145124
PCT Pub. Date: Apr. 12, 2008

(65) Prior Publication Data
US 2010/0127975 A1   May 27, 2010

(30) Foreign Application Priority Data

May 30, 2007   (DK) ................................ 2007 00777
Apr. 25, 2008   (WO) ................ PCT/DK2008/000157

(51) Int. Cl.
*G06F 3/041* (2006.01)
*G06K 9/00* (2006.01)
*G09G 5/00* (2006.01)

(52) U.S. Cl.
USPC ............................. 345/173; 382/115; 345/156

(58) Field of Classification Search
USPC .................. 345/157, 173–178, 454; 382/115
See application file for complete search history.

(56) References Cited

U.S. PATENT DOCUMENTS

| 5,696,684 | A | * | 12/1997 | Ueberschaer | ................ | 701/455 |
| 7,084,859 | B1 |  | 8/2006 | Pryor | | |
| 7,969,410 | B2 | * | 6/2011 | Kakarala | ........................ | 345/156 |
| 2004/0164968 | A1 | * | 8/2004 | Miyamoto | ..................... | 345/173 |
| 2005/0128182 | A1 | * | 6/2005 | Gordon | ......................... | 345/156 |
| 2005/0162404 | A1 | * | 7/2005 | Chiu et al. | ..................... | 345/173 |
| 2007/0160263 | A1 | * | 7/2007 | Abiko et al. | .................. | 382/115 |
| 2007/0236450 | A1 | * | 10/2007 | Colgate et al. | ................ | 345/156 |
| 2008/0150905 | A1 | * | 6/2008 | Grivna et al. | ................. | 345/173 |

FOREIGN PATENT DOCUMENTS

| DE | 4143364 | A1 |  | 9/1993 | | |
| JP | 2000020194 | A | * | 1/2000 | ............... | G06F 3/00 |
| JP | 2005-257343 |  | * | 9/2005 | ............... | G01L 5/00 |
| JP | 2007-072660 |  | * | 3/2007 | ............. | G06F 3/041 |
| JP | 2007072660 | A |  | 3/2007 | | |

* cited by examiner

*Primary Examiner* — Alexander S Beck
*Assistant Examiner* — Nguyen H Truong
(74) *Attorney, Agent, or Firm* — David A. Guerra

(57) ABSTRACT

A touchpad- or touch screen-based device has a touch-sensitive sensor surface and can generate electrical and/or optical signals dependent on the placement and/or movement of a finger physically contacting the sensor surface. The sensor surface comprises a corrugated surface in at least one sub-area, thereby providing a user with two modes for finger movement across the sensor surface, namely a first mode for sliding movement at a first finger pressure, and a second mode for guided movement at a second finger pressure higher than the first finger pressure.

18 Claims, 4 Drawing Sheets

TOUCH-SENSITIVE POINTING DEVICE WITH GUIDING LINES

CROSS-REFERENCE TO RELATED APPLICATIONS

This application is an U.S. national phase application under 35 U.S.C. §371 based upon co-pending International Application No. PCT/DK2008/000157 filed on Apr. 25, 2008. Additionally, this U.S. national phase application claims the benefit of priority of co-pending International Application No. PCT/DK2008/000157 filed on Apr. 25, 2008 and Denmark Application No. PA 2007 00777 filed on May 30, 2007. The entire disclosures of the prior applications are incorporated herein by reference. The international application was published on Dec. 4, 2008 under Publication No. WO 2008/145124.

TECHNICAL FIELD

The invention relates to a touch-sensitive pointing device for controlling at least two coordinates of a movement, said pointing device being provided with a touch-sensitive sensor surface generating electrical and/or optical signals dependent on the placement and/or movement of a finger in physical contact with the sensor surface.

The invention further relates to a method for moving a cursor on a computer display from a first cursor position to a second cursor position in response to a finger's movement on a touch-sensitive sensor surface of a touch-sensitive pointing device.

BACKGROUND

Touch-sensitive sensor surfaces, such as a touchpad on a laptop or a touch screen, that generate signals dependent on the placement and/or movement of a finger physically contacting the sensor surface, are known in the art. The movement of the finger may be defined in terms of direction, speed and/or acceleration. Known sensor surfaces that are adapted to record a finger's arbitrary two-dimensional placement and/or movement are substantially smooth.

Many computer programs have a broad margin for correctly controlling the cursor during vertical movements, whereas controlling the cursor during horizontal movements is more problematic. This is for example the case when choosing between submenus.

Recent studies have shown that the use of touchpads may lead to injuries substantially corresponding to so-called mouse injuries, the injury merely being to other muscles and tendons. The use of a touchpad requires even more fine motor skills than the use of a mouse. Being forced to use a touchpad when working on a laptop is thus usually a source of irritation. In addition, the use of common touchpads poses problems for people with disabilities.

DISCLOSURE TO THE INVENTION

The object of the invention is to provide a pointing device with a touch-sensitive sensor surface and a method for using such a touch-sensitive pointing device, which over-come the disadvantages mentioned above.

This is achieved by a touch-sensitive pointing device of the above-mentioned type, wherein the sensor surface comprises a corrugated area formed by a plurality of alternating ridges and grooves extending in a first direction along substantially straight lines, wherein neighbouring ridges are arranged substantially parallel and with a mutual distance from each other.

The term corrugation comprises all arrangements of alternating ridges and grooves independent of the particular cross-sectional shape thereof. For example, suitable cross-sectional shapes of corrugation include, but are not limited to wavy, serrated, notched, or rectangular shapes.

The term touch-sensitive pointing device refers to an input device, specifically a human interface device, allowing a user to input spatial data to a computer echoing a movement of a finger in tactile interaction with a touch-sensitive surface of the pointing device.

It should be noted that the physical contact between the finger and the sensor surface may also be indirect, such as through a safety glove.

The interaction of the finger with the sensor surface is detected and/or converted by means of a transducer in order to create signals, which may be optical signals or magnetic signals, but which are usually electrical signals.

The device may further comprise means for collecting and treating the signals from the sensor, and converting them into movement instructions for controlling a movement. These means may be a signal treatment unit. The signals may be directed into the signal treatment unit which, for example by means of a program, converts the signals generated by the touchpad-based unit into commands for controlling the movement.

The touch-sensitive pointing device according to the present application is adapted to detect and/or record the finger's position and movements in two dimensions. In typical applications, the touch-sensitive pointing device is intended for the control of at least two independent coordinates of a movement controlled by the touch-sensitive pointing device, such as the two-dimensional movement of a cursor on a computer display.

Such pointing devices are typically used in combination with a graphical user interface in order to control the position and movement of a cursor on the computer display. A similar pointing device could also control the vertical and horizontal scrolling in a window on the computer display.

The controlled movement may also be a mechanical movement comparable to the movements in a machine control, a motorised workbench with several axes for linear or rotating movements in an industrial production, a crane, a robot arm, micro manipulators, aids for persons with disabilities, and the like.

Touch-sensitive pointing devices according to the invention may thus be used as an input unit connected to a computer or an electrical control unit, for example in the form of an independent unit, in combination with a keyboard or in combination with a touch screen.

Common examples for touch sensitive pointing devices with a touch sensitive sensor surface are touchpads as used on portable computing devices or touch screens where a touch sensitive input device is provided in front of a display, such as those used at vending machines, certain cashiers or on car navigation systems.

When a number of parallel guiding lines in the form of alternating ridges and grooves are provided with a distance between them that is narrower than the area of contact of a finger contacting the sensor surface, the finger tip is supported by a plurality of ridge tops at a time. The finger can easily glide freely, i.e. in any direction, on the sensor surface and thus e.g. control the movement of a cursor freely, i.e. in any direction, while, at the same time, it is possible at any time to lock the movement in a direction parallel to the guiding lines by increasing the pressure of the finger slightly.

That a movement more or less perpendicular to the direction of the ridges and groves can be performed with ease is somewhat counterintuitive. But with light finger pressure, where the surface of the finger is not substantially deformed, the resistance to the movement is actually less than on a similar smooth surface due to the smaller real contact area.

Depending on the finger pressure applied when moving the finger over the sensor surface of a pointing device according to the invention, the corrugated area provides the user with two distinct modes of movement, namely a first mode for sliding movement, where a first, low finger pressure is applied merely providing for a physical contact between the finger tip and the sensor surface, so that the finger may slide freely across the sensor surface, and a second mode for guided movement, where a second finger pressure higher than the first finger pressure is applied providing for a guiding interaction between the finger tip and the corrugation, so that the finger may easily be moved along the ridges in the first direction.

The advantage of the corrugated sensor surface is that the ridges and grooves of the corrugation may be used as guiding lines, and thus guiding aids, aiding the user (which may be disabled) to easily direct the movement of his or her finger in a certain direction, for example in relation to a system of co-ordinates, preferred directions of a cursor on the screen, the various movement axes of a robot, and the like.

When controlling the movement of a cursor on a computer display, the direction of the guiding lines (ridges and/or grooves) preferably corresponds to the direction of a screen coordinate system of the computer display. Movements along the direction of the ridges and/or grooves (first direction) are then echoed on the screen by a cursor movement keeping one of the screen coordinates of the cursor, typically the vertical coordinate Y, constant—only changing the other coordinate, typically the horizontal coordinate X. Advantageously, the first direction on the touchpad corresponds to the horizontal screen coordinate on the computer display.

By means of the device according to the invention, a user may easily, e.g. without pressing any keys, lock the movement temporarily to be strictly horizontal. Also in regard to the small final movements, where the cursor is led to an area on the screen which is very constricted both horizontally and vertically, it has proven advantageous to be able to lock the movement to be strictly horizontal or strictly vertical. When moving close to the constricted area, the user may first concentrate on fine-tuning a first coordinate of the cursor, e.g. the vertical coordinate, and then, without risk of losing the first coordinate alignment, concentrate on fine-tuning a second coordinate, e.g. the horizontal coordinate. This method has been shown to be less demanding with respect to the fine motor skills required in the fingers, hand and arm of a user and it is an example of how a device according to the invention may improve the ergonomics of an input unit so that strain injuries (e.g. repetitive strain injury) are reduced or even avoided.

How strongly the corrugation affects the movement of the finger mechanically depends on the finger pressure, i.e. the pressure applied by the finger on the sensor surface, and/or on the corrugation amplitude, i.e. the height/depth of the ridges and grooves, the degree of interaction increasing with the height/depth of the guiding lines. In practice, the finger tip may be only touching the top of the ridges. In this case, the guiding interaction may depend on the shape of the ridge tops.

Further according to one embodiment of a pointing device according to the invention, the corrugated area has a wavy cross-section. The term wavy comprises cross-sections with an essentially sinusoidal or similar shape with rounded ridge tops. The advantage of the wavy cross-section is that the ridge tops are rounded, thereby making it easier to move the finger in a direction crossing the direction of the ridges in the first mode for sliding finger movement while still providing a guiding interaction effect in the second mode for guided finger movement.

Further according to another embodiment of a pointing device according to the invention, the corrugated area has a serrated cross-section. The term serration comprises cross-sections with a triangular shape, saw-tooth like shape, curved grooves with pointed ridge tops, or any similar shape. The advantage of the serration is that the ridge tops of a serrated cross-section comprise a pointed or sharp edge, thereby enhancing the guiding interaction effect in the second mode for guided finger movement.

Further according to one embodiment of a pointing device according to the invention, the distance between neighbouring ridges is chosen such that, when the touch-sensitive pointing device is in use, the finger is simultaneously in contact with at least three neighbouring ridges, preferably five or more neighbouring ridges. When placing the finger on the sensor surface a contact area is established between the finger tip and the sensor surface wherein a transverse dimension of the contact area is at least three times, preferably five or more times larger than the distance a between neighbouring ridges. As a consequence, a plurality of at least three, preferably five or more parallel guiding lines in the form of alternating ridges and grooves simultaneously support the finger tip. Thereby it is achieved, that the finger can easily glide freely, i.e. in any direction, on the sensor surface avoiding a humping movement of the finger following the corrugated topography of the sensor surface.

Further according to one embodiment of a pointing device according to the invention, the distance between neighbouring ridges is between 0.1 mm and 3 mm, alternatively between 0.2 mm and 2 mm, and preferably about 1 mm.

Further according to one embodiment of a pointing device according to the invention, the corrugation amplitude is between 0.05 mm and 2 mm, alternatively between 0.1 mm and 1 mm, and preferably about 0.5 mm.

Further according to one embodiment of a pointing device according to the invention, the width of the ridges is essentially equal to the width of the grooves.

According to a further aspect of the invention, a method is provided for moving a cursor on a computer display from a first cursor position to a second cursor position in response to a fingers movement on a touch-sensitive sensor surface of a touch-sensitive pointing device, wherein the sensor surface is provided with a corrugated area formed by a plurality of alternating ridges and grooves extending in a first direction along substantially straight and mutually parallel lines, wherein neighbouring ridges are arranged at a distance from each other, said method comprising the steps of (a) bringing the finger in contact with the sensor surface, (b) aligning the cursor with a first coordinate of the second cursor position by moving the finger across the corrugated area while applying a first finger pressure, and (c) bringing the cursor to the second cursor position by moving the finger in a guided movement along the ridges in the first direction while applying a second finger pressure higher than the first finger pressure.

As mentioned above, using a touch-sensitive pointing device with a corrugated touch-sensitive sensor surface for controlling the movement of a cursor on a computer display allows a user to break up the task of adjusting two screen coordinates into adjusting one screen coordinate at a time. Instead of having to position a cursor on a screen by simultaneously adjusting both coordinates, the user may use the first mode for sliding movement in order to first adjust the first coordinate ignoring any changes in the second coordinate. Subsequently, the user may use the second mode for guided movement in order to adjust the second coordinate while keeping the already adjusted first coordinate constant, thereby bringing the cursor to its destination.

Breaking the movement up in two independent steps simplifies the fine adjustment task, thereby substantially reducing need for fine motor skills, and as a consequence reducing the strain on the user's fingers, hand and/or arm.

Further according to one embodiment of a method according to the invention, the finger is in step (b) moved essentially perpendicular to the first direction.

Advantageously, when moving the finger in the direction along the ridges and grooves the cursor is moved horizontally on the computer display, while finger movements perpendicular to the first direction generate a vertical movement of the cursor.

Thereby, during the first movement at the first finger pressure, the Y-coordinate of the cursor is varied while keeping the X-coordinate of the cursor essentially constant. The subsequent movement for moving the cursor to its destination is performed parallel to the first direction exploiting the above-mentioned guiding effect in order to lock the cursor movement in the Y-direction and vary only the X-coordinate of the cursor.

Further according to one embodiment of a method according to the invention, a cursor line is provided on the computer display when pressing a key or bringing the finger in contact with the sensor surface, said cursor line having a constant coordinate essentially equal to the corresponding coordinate of the cursor.

The additional cursor line acts as an alignment aid helping the user to align the cursor with a desired Y-coordinate. The alignment aid is shown in addition to the original cursor or in addition to a modified cursor. The optional change of the cursor to show the alignment aid may be context controlled, such as when working in a particular type of application or within an application when bringing certain regions, frames, or windows in focus.

Preferably, the alignment aid is a horizontal cursor line essentially extending across the whole display region in focus, where the display region may for example be a frame within a window, a window or the whole display. The cursor line follows the movements of the cursor in vertical direction.

Alternative according to another embodiment, the alignment aid may be a cursor line having another direction depending on the orientation of the guiding lines on the touch-sensitive surface of the touch sensitive pointing device.

Further according to the invention, a keyboard may advantageously comprise a touch-pad-based device according to the invention. It may be advantageous to arrange one or more devices according to the invention in a grouping with other input units, such as a keyboard with display units, such as a screen.

Furthermore, a device according to the invention may advantageously be part of an arrangement for generation of electrical and or optical signals dependent on the placement and/or movement of a finger physically contacting a surface, the arrangement comprising two or more separate sensor surfaces with guiding lines according to the invention. An example of this could be an arrangement of separate sensor surfaces for controlling a grouping of a number of independent motorised units, such as micro manipulators for handling of microscopic material, where each of the sensor surfaces is connected to its own motorised unit in order to control the movements of this.

BRIEF DESCRIPTION OF THE DRAWINGS

The invention is explained in detail below with reference to the drawings. The drawings show in FIG. 1 an embodiment of a touchpad according to the invention seen from above with an arrangement of parallel guiding lines in a first direction, FIG. 2 a further embodiment of a touchpad according to the invention seen from above, FIG. 3 a further embodiment of a touchpad according to the invention seen from above with an arrangement of parallel guiding lines in a second direction, FIG. 4 a sectional view of an embodiment of a touchpad, as e.g. seen in FIG. 1, on a larger scale, the section being made along the line I-I in FIG. 1, FIG. 5 a sectional view of another embodiment of a touchpad, as e.g. seen in FIG. 1, on a larger scale, the section being made along the line I-I in FIG. 1, and FIG. 6 a sectional view of a preferred embodiment of a touchpad, the section corresponding to the section along the line I-I in FIG. 1.

DETAILED DESCRIPTION OF THE INVENTION

Figure 1:
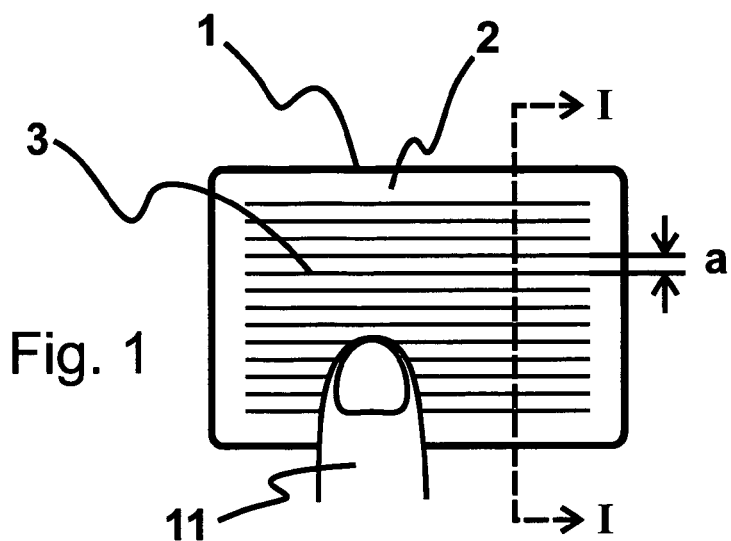

Schematically and seen from above, FIG. 1 shows a touchpad 1 according to the invention with a sensor surface 2 an area of which is provided with a number of straight guiding lines 3 extending mutually parallel in a first direction. The guiding lines 3 are distributed over the entire area and the number of guiding lines may for example be determined by the distance a between them in relation to the size of the area.

The first direction may be defined as corresponding to a first preferred direction of the movement controlled by means of the touchpad 1, e.g. the movement of a cursor on a computer screen in a horizontal direction.

In the embodiment shown in FIG. 1, the area with the guiding lines 3 substantially covers the entire sensor surface 2.

Figure 2:
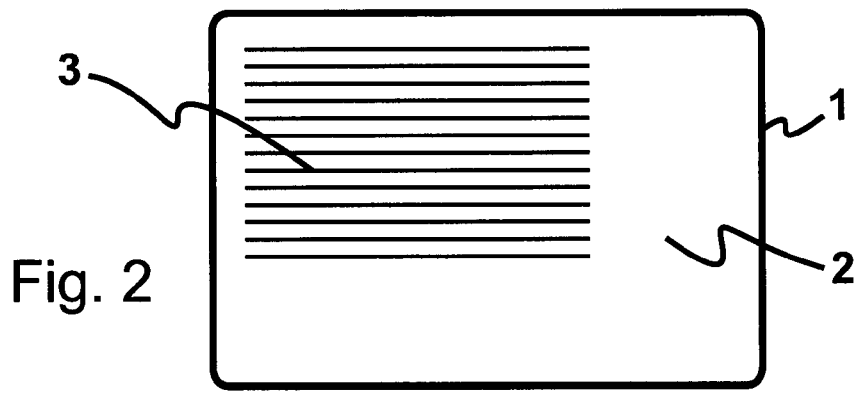

Contrary to this, FIG. 2 shows an embodiment in which the area with the guiding lines 3 only partly covers the sensor surface, leaving smooth, uncorrugated areas. It is thus possible optionally to use the touchpad 1 in a traditional way, and e.g. move the finger freely on the uncorrugated area on the sensor surface 2, or scroll in a window on a computer screen.

Figure 3:
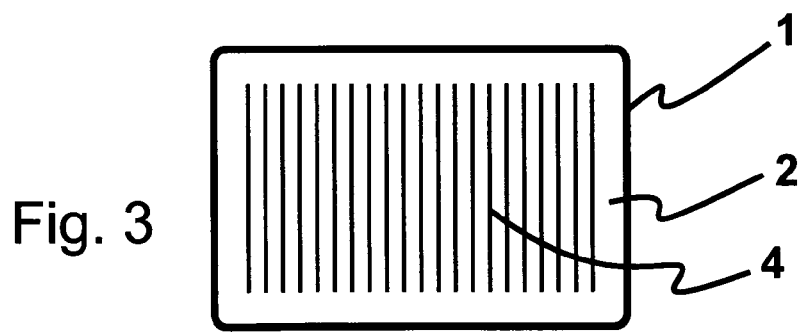

FIG. 3 shows an embodiment of a touchpad according to the invention in which guiding lines 4 are arranged mutually parallel and extend in a second direction, which is substantially perpendicular to the first direction. The second direction may advantageously be defined as corresponding to a second preferred direction of the movement controlled by means of the touchpad 1, for example the movement of a cursor on a computer screen in a vertical direction.

Figure 4:
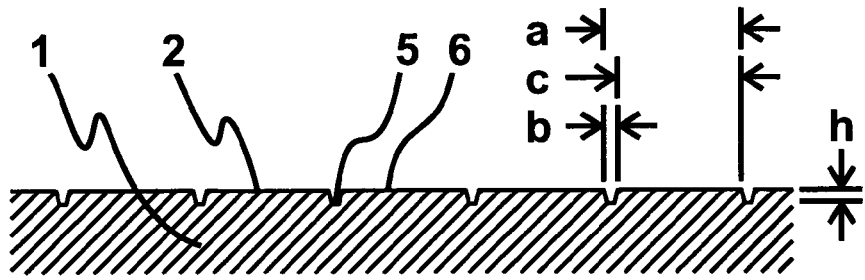
Figure 5:
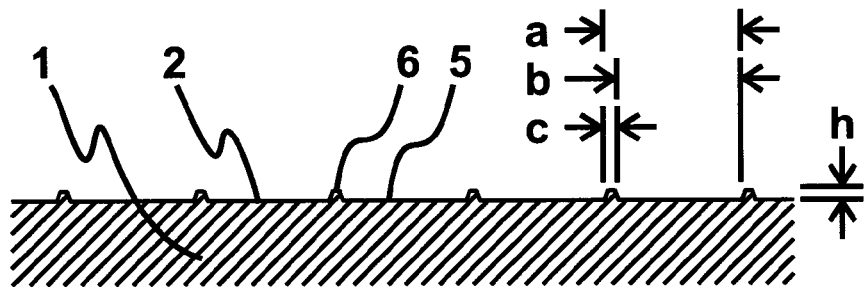
Figure 6:
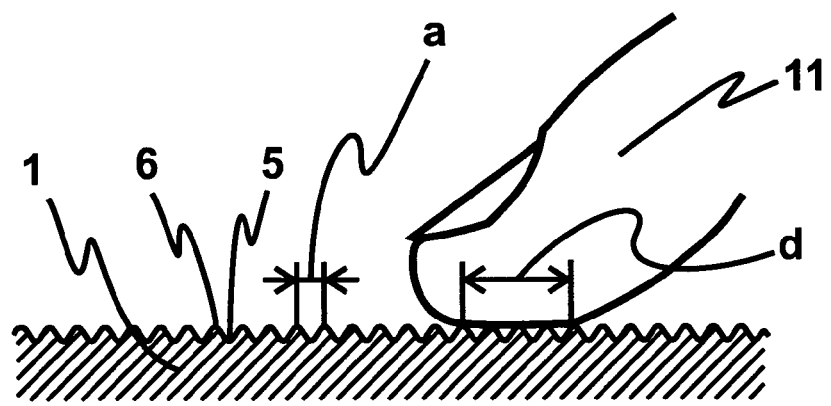

FIGS. 4-6 show sectional views, each section being made along the line I-I in FIG. 1, of various embodiments of a touchpad 2 with guiding lines 3 on the sensor surface. The guiding lines are formed by alternating ridges having a width c and a height h and grooves having a width b and a depth h. Neighbouring guiding lines are arranged with a mutual distance a=b+c with respect to each other.

FIG. 4 shows an embodiment in which the guiding lines 3 are shaped as narrow grooves 5 separated by wide ridges 6.

FIG. 5 shows an embodiment in which the guiding lines 3 are shaped as narrow ridges 6 separated by wide grooves 5.

FIG. 6 shows an embodiment in which alternately grooves 5 and ridges 6 are arranged mutually parallel forming a corrugated sensor surface with a corrugation amplitude h and a corrugation period a=b+c. In the embodiment shown in FIG. 6, the width of the ridges c is essentially equal to the width of the grooves b.

When a finger is placed on the sensor surface 2 of a touchpad 1, a contact surface having a diameter d of tactile interaction is formed where the finger interacts with the sensor surface 2.

FIG. 4 shows an embodiment in which the width b of the grooves 5 forming the guiding lines 3 is substantially smaller than the width c of the ridges 6 in between. The grooves 5 thus form a tactile structure on the sensor surface 2, the tactile structure being in the form of a line pattern with substantially plane elevated panels between the notch-like guiding lines 3. The sum of the width c of the ridges 6 and the width b of the grooves 5 equals the distance a between neighbouring guiding lines.

FIG. 5 shows an embodiment in which the width c of the ridges 6 forming the guiding lines 3 is substantially smaller than the width b of the grooves 5 in between. The ridges 6 thus form a tactile structure on the sensor surface 2, the tactile structure being in the form of a line pattern with lowered, substantially plane panels between the elevated guiding lines 3.

FIG. 6 shows in addition to a cross-section of a further embodiment of a touch-sensitive pointing device according to the invention also a finger in contact with the sensor surface 2 forming a contact area of tactile interaction with a diameter d. The tactile structure on the sensor surface 2 is formed by alternate grooves 5 and ridges 6 and may be described as corrugated. The distance a between neighbouring guiding lines 3, the width c of the ridges 6 and the width b of the grooves 5 are smaller than the diameter d of the contact surface. The finger tip is therefore supported by a plurality of ridge tops, viz. five ridge tops in the case of FIG. 6. In practice, the actual number of ridge tops in contact with the finger tip varies and may depend on the size of the finger of a given user, and the finger pressure applied. A suitable dimension of the distance a between neighbouring ridges may be within the range between 0.1 mm and 3 mm, alternatively between 0.2 mm and 2 mm, and preferably about 1 mm covering most applications encountered in practice. The dimension of the corrugation amplitude h may be selected from the range between 0.05 mm and 2 mm, alternatively between 0.1 mm and 1 mm, and preferably about 0.5 mm.

With light finger pressure in a first mode for sliding finger movement the contact surface of the finger is almost flat only contacting the very top of the ridges, as shown on FIG. 6. The friction is almost independent of movement direction in spite of the structure of the surface. When finger pressure is increased the contact surface of the finger is no longer flat, but increasingly adapts to the shape of the corrugation. A second mode for guided movement is thereby achieved, where the friction is lowest in a direction parallel to the guiding lines 3. In this mode the surface feels smooth in the direction of the guiding lines and rough in other directions. The difference in friction between moving in a direction along the guiding lines and moving in other directions may thus be increased by increasing the pressure of the finger. The device may then function almost like an ordinary touchpad, but with the difference that the movement of the finger may easily be locked to move in the exact direction of the guiding lines.

Suitable cross-sectional shapes of corrugation include, but are not limited to wavy, serrated, notched, or rectangular shapes. The embodiment shown in FIG. 6 has a wavy corrugation with an essentially sinusoidal cross-sectional shape.

Reference is now made to FIG. 7-FIG. 10 in order to explain a fingers movement over a touch-sensitive sensor surface when using a prior art pointing device (FIG. 7) and when using a pointing device 1 according to the invention (FIG. 8, FIG. 9) for moving a cursor 8 displayed on a computer display 7 at screen coordinates (Xc, Yc) from a start point S with screen coordinates (Xs, Ys) to an end point E with screen coordinates (Xe, Ye) by moving the finger on the sensor surface from a first point A to a second point B.

Figure 7:
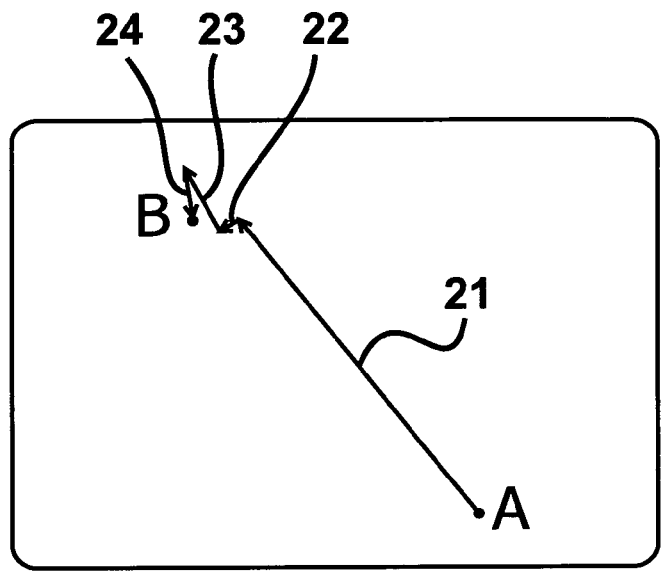
FIG. 7 schematically, the movements of a finger when using a prior art touchpad for moving a corresponding cursor from a first point A to a second point B, FIG. 8 schematically, a sequence of finger movements when using a touchpad according to one embodiment of the invention for moving the cursor from point A to point B, FIG. 9 schematically, a different sequence of finger movements of a finger when using a touchpad according to one embodiment of the invention for bringing the cursor from point A to point B, and FIG. 10 a cursor with an alignment aid on a display.

FIG. 7 shows a typical sequence of movements 21, 22, 23, 24 when using a prior art touchpad. Typically, when using a prior art touchpad for controlling cursor movement on a computer display, a first long sliding movement 21 is performed in order to bring the cursor from the start point S to the vicinity of the end point E. In order to bring the cursor to its destination, end point E, a subsequent series of multiple small movements 22, 23, 24, often performed in an almost erratic manner as shown in the vicinity of point B in FIG. 7, is required and involves a high level of fine motor skills, thereby putting an increased repetitive strain on the muscles and tendons involved.

Figure 8:
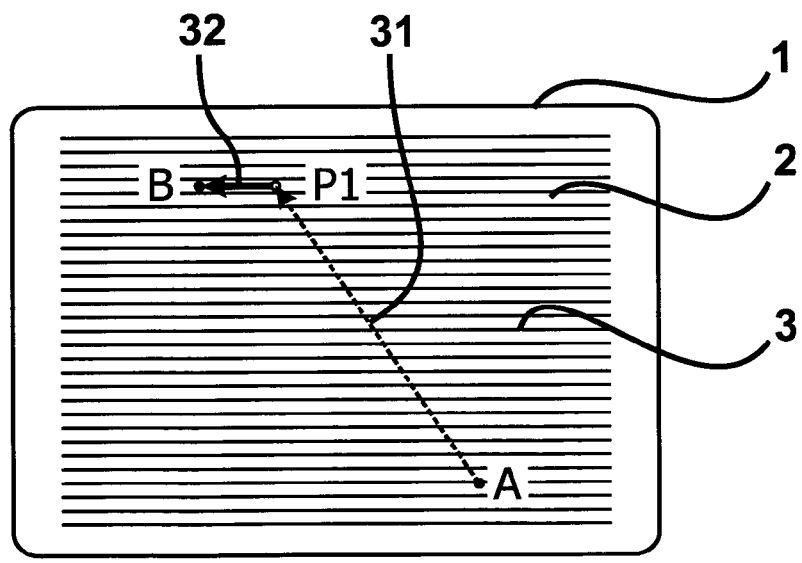

FIG. 8 shows a sequence of movements 31, 32 when using a touch-sensitive pointing device 1 according to the invention for controlling cursor movement on a computer display 7. The sequence 31, 32 comprises a first series of sliding finger movements 31 from point A to an intermediate point P1 for bringing the cursor 8 from the start point S to a point in the vicinity of the end point E, and a second series of guided finger movements 32 from the intermediate point P1 to point B for bringing the cursor 8 to its destination at the end point E.

The finger 11 is brought into contact with the sensor surface 2 at point A applying a first finger pressure to the sensor surface 2. The first finger pressure provides the user with a first mode for sliding movement, where the finger 11 may slide freely across the sensor surface 2 in an arbitrary direction. The first finger pressure merely provides for physical contact between the finger 11 and the sensor surface 2, while still allowing the user to easily slide the finger 11 freely across the sensor surface 2 almost like on a prior art touchpad.

The first series of finger movements is performed at the first finger pressure in order to bring the cursor 8 in a first, typically horizontal alignment with the end point E. This is achieved at the intermediate point P1 where the second coordinate Yc of the cursor 8 is equal to the second coordinate Ye of the end point E.

Surprisingly in practice, it requires significantly less fine motor skills for a user to align a single coordinate and a single first mode movement 31 may be enough to bring the cursor 8 into the first alignment with the end point E.

When the cursor 8 is brought in alignment with the second coordinate Ye of the end point E, the finger 11 rests at an intermediate point P1 on the sensor surface 2.

At point P1, the finger pressure with which the finger 2 is pressed onto the corrugated sensor surface 2 is slightly increased from the first finger pressure to a second finger pressure. Thereby a guiding effect for finger movements in a direction along the guiding lines 3, i.e. along the ridges 6 and/or grooves 5 of the corrugation, is achieved.

The second series of movements 32 along the direction of the guiding lines 3 is performed at the second finger pressure in order to adjust the first screen coordinate Xc of the cursor 8, thereby bringing the cursor 8 from the intermediate point P1 to its end point E at the screen coordinates (Xe, Ye).

When aligning the cursor 8 with the Xe-coordinate of the end point E, the Ye-coordinate is easily maintained due to the guiding effect of the corrugated sensor surface 2 when used in the second movement mode, i.e. applying the increased finger pressure. The user may therefore again concentrate on aligning only a single coordinate in order to bring the cursor 8 to its destination, end point E—a task requiring surprisingly little fine motor skills. The movement may therefore typically be performed in a single second mode movement 32. As a consequence, the ergonomics of the movement is improved considerably and physical strain produced in the user is reduced substantially.

Figure 9:
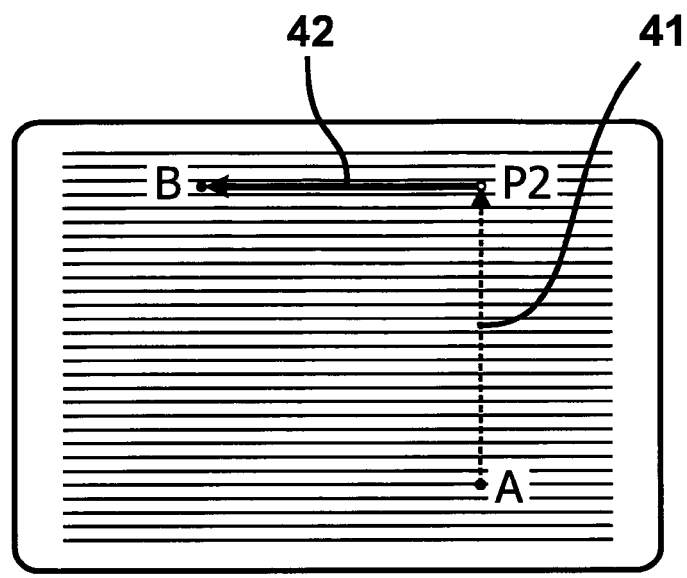

In FIG. 8 and FIG. 9, movements are shown as arrows 31, 32, 41, 42, where the first, lower finger pressure is indicated by a broken line, while the second, increased finger pressure is indicated by a thick solid line.

FIG. 9 shows a special case for a sequence of movements when using a touch-sensitive pointing device 1 according to the invention. As shown in FIG. 9, the first movement 41 at the first finger pressure may also be performed in a direction perpendicular to the direction of the guiding lines 3 for bringing the cursor 8 from the start point S into alignment with the second coordinate Ye of the end point E keeping the first coordinate Xc of the cursor 8 essentially constant. The subsequent movement 42 is performed in the previously described guided manner along the first direction, i.e. in the direction of the guiding lines 3, thereby bringing the cursor 8 to the end point E.

Figure 10:
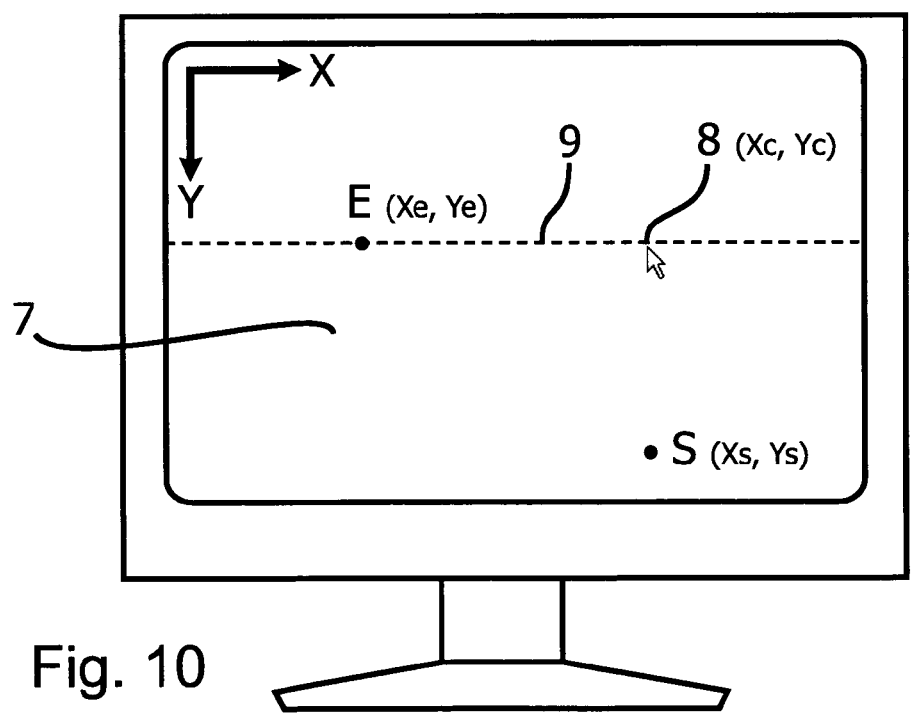

FIG. 10 illustrates how the cursor 8 may be provided with an additional alignment aid 9 displayed on the computer display 7 in order to help the user to align the cursor 8 with the Ye coordinate. The cursor 8 may change to show the alignment aid 9 upon the user pressing a key or touching the sensor surface 2 with the finger 11. The alignment aid 9 is shown in addition to the original cursor 8 or in addition to a modified cursor. The optional change of the cursor 8 to show the alignment aid 9 may be context controlled, such as when working in a particular type of application or within an application when bringing certain regions/frames/windows in focus. Preferably, the alignment aid 9 is a horizontal line essentially extending across the whole display region in focus, where the display region may for example be a frame within a window, a window or the whole computer display 7.

The sequence of movement as shown in FIG. 9, aided by the cursor line 9, is especially relaxing and could be preferred generally or for example by a person working in a train or a person with disabilities.

LIST OF REFERENCE NUMBERS

1 touch-sensitive pointing device
2 sensor surface
3 guiding line
4 guiding line
5 groove
6 ridge
7 computer display
8 cursor
9 cursor line
11 finger
21, 22, 23, 24 finger movement
31, 41 first mode finger movement
32, 42 second mode finger movement
a distance between neighbouring ridges/grooves
b width of groove
c width of ridge
h corrugation amplitude
d diameter of contact surface
A, B point on the sensor surface
P1, P2 intermediate point on the sensor surface
Xc, Yc cursor screen coordinates
Xs, Ys start point screen coordinates
Xe, Ye end point screen coordinates

The invention claimed is:

1. A touch-sensitive pointing device, in the form of a touch-pad, for controlling at least two coordinates of a movement of a cursor on a computer display and/or the vertical and horizontal scrolling in a window on a computer display, said pointing device comprising:
   a touch-sensitive sensor surface generating signals dependent on at least one of the placement, and movement of a finger in physical contact with said sensor surface;
   wherein said touch-sensitive sensor surface comprises a corrugated area formed by a plurality of alternating grooves and ridges extending in a first direction along substantially straight lines, wherein neighbouring ridges are arranged substantially parallel and with a mutual distance from each other between 0.2 mm and 3 mm;
   wherein said corrugated area being configured to provide a first friction independent of finger movement direction thereon with application of a first finger pressure mode, and to provide a second friction which is lower in a direction parallel to said corrugated area than in other finger movement directions respectively upon a second finger pressure mode on said corrugated area.

2. The touch-sensitive pointing device according to claim 1, wherein said signals are electrical signals.

3. The touch-sensitive pointing device according to claim 1, wherein said signals are optical signals.

4. The touch-sensitive pointing device according to claim 1, wherein said corrugated area has a wavy cross-section.

5. The touch-sensitive pointing device according to claim 1, wherein said corrugated area has a serrated cross-section.

6. The touch-sensitive pointing device according to claim 1, wherein said distance between neighbouring ridges is such that, when said touch-sensitive pointing device is in use, said finger is simultaneously in contact with at least three neighbouring ridges.

7. The touch-sensitive pointing device according to claim 1, wherein said distance between neighbouring ridges is such that, when said touch-sensitive pointing device is in use, said finger is simultaneously in contact with five or more neighbouring ridges.

8. The touch-sensitive pointing device according to claim 1, wherein said distance between neighbouring ridges is 1 mm.

9. The touch-sensitive pointing device according to claim 1, wherein corrugation amplitude of said corrugated area is between 0.05 mm and 2 mm.

10. The touch-sensitive pointing device according to claim 9, wherein corrugation amplitude of said corrugated area is between 0.1 mm and 1 mm.

11. The touch-sensitive pointing device according to claim 10, wherein corrugation amplitude of said corrugated area is 0.5 mm.

12. The touch-sensitive pointing device according to 1, wherein said grooves have a width essentially equal to a width of said ridges.

13. The touch-sensitive pointing device according to 1, wherein said touch-sensitive sensor surface further comprising a non-corrugated area.

14. A touch-sensitive pointing device for controlling at least two coordinates of a movement, said pointing device comprising:
- a touch-sensitive sensor surface generating signals dependent on one of the placement, and movement of a finger in physical contact with said sensor surface;
- wherein said touch-sensitive sensor surface comprises a corrugated area formed by a plurality of alternating grooves and ridges extending in a first direction along substantially straight lines, wherein neighbouring ridges are arranged substantially parallel and with a mutual distance from each other;
- wherein said distance between neighbouring ridges is such that, when said touch-sensitive pointing device is in use, said finger is simultaneously in contact with at least three neighbouring ridges;
- wherein said distance between neighbouring ridges is between 0.1 mm and 3 mm;
- wherein corrugation amplitude of said corrugated area is between 0.05 mm and 2 mm;
- wherein said corrugated area being configured to provide a first friction independent of finger movement direction on said corrugated area with application of a first finger pressure mode, and to provide a second friction which is lower in a direction parallel to said ridges of said corrugated area than in other finger movement directions respectively upon a second finger pressure mode on said corrugated area.

15. The touch-sensitive pointing device according to 14, wherein said grooves have a width essentially equal to a width of said ridges.

16. A method of using a touch-sensitive pointing device for moving a cursor on a computer display from a first cursor position to a second cursor position in response to a finger's movement on a touch-sensitive sensor surface of said touch-sensitive pointing device, wherein said touch-sensitive sensor surface is provided with a corrugated area formed by a plurality of alternating grooves and ridges extending in a first direction along substantially straight and mutually parallel lines, wherein neighbouring ridges are arranged at a distance a from each other, said method comprising the steps of:
- a) bringing said finger in contact with said touch-sensitive sensor surface at a first point on said touch-sensitive sensor surface;
- b) aligning said cursor with a first coordinate of said second cursor position by moving said finger across said corrugated area to an intermediate point on said touch-sensitive sensor surface while applying a first finger pressure;
- c) bringing said cursor to said second cursor position by moving said finger from said intermediate point to a second point on said touch-sensitive sensor surface in a guided movement along said ridges in said first direction while applying a second finger pressure higher than said first finger pressure; and
- d) configuring said neighbouring ridges to have a mutual distance from each other between 0.2 mm and 3 mm;
- e) configuring said corrugated area so as to provide a first friction independent of finger movement direction thereon with application of a first finger pressure mode on said corrugated area, and to provide a second friction lower in a direction parallel to said corrugated area than in other finger movement directions respectively upon a second finger pressure mode on said corrugated area.

17. The method according to claim 16, wherein in step b) said finger is moved essentially perpendicular to said first direction.

18. The method according to claim 17, wherein a cursor line is provided on said computer display when pressing a key or bringing said finger in contact with said touch-sensitive sensor surface, said cursor line having a constant first coordinate equal to said first coordinate of said cursor.

* * * * *